United States Patent
Arita et al.

(10) Patent No.: US 10,141,751 B2
(45) Date of Patent: Nov. 27, 2018

(54) CONTROL SYSTEM FOR ELECTRIC STORAGE SYSTEM

(71) Applicant: Hitachi, Ltd., Tokyo (JP)

(72) Inventors: Hiroshi Arita, Tokyo (JP); Hideki Inoue, Tokyo (JP); Tooru Akatsu, Tokyo (JP); Masashi Toyota, Tokyo (JP)

(73) Assignee: Hitachi, Ltd., Tokyo (JP)

(*) Notice: Subject to any disclaimer, the term of this patent is extended or adjusted under 35 U.S.C. 154(b) by 180 days.

(21) Appl. No.: 15/116,583

(22) PCT Filed: Sep. 22, 2014

(86) PCT No.: PCT/JP2014/074985
§ 371 (c)(1),
(2) Date: Aug. 4, 2016

(87) PCT Pub. No.: WO2015/129087
PCT Pub. Date: Sep. 3, 2015

(65) Prior Publication Data
US 2016/0352111 A1 Dec. 1, 2016

(30) Foreign Application Priority Data
Feb. 26, 2014 (JP) ................ 2014-035062

(51) Int. Cl.
*H02J 7/00* (2006.01)
*H02J 5/00* (2016.01)
(Continued)

(52) U.S. Cl.
CPC ....... *H02J 7/0019* (2013.01); *H01M 10/4207* (2013.01); *H01M 10/482* (2013.01);
(Continued)

(58) Field of Classification Search
USPC ........................................................ 320/126
See application file for complete search history.

(56) References Cited

U.S. PATENT DOCUMENTS

2013/0113437 A1 5/2013 Ishibashi et al.
2013/0320772 A1* 12/2013 Qiao et al. ............ 307/87

FOREIGN PATENT DOCUMENTS

JP 2009-29445 2/2009
JP 2012-205480 A 10/2012
(Continued)

OTHER PUBLICATIONS

International Search Report of PCT/JP2014/074985 dated Oct. 28, 2014.

*Primary Examiner* — Robert Grant
(74) *Attorney, Agent, or Firm* — Mattingly & Malur, PC

(57) ABSTRACT

A control system for an electric storage system, in which a plurality of pairs of storage batteries and converters are connected in parallel to a power system, includes: a unit that decides charge and discharge of total power by the pairs of storage batteries and converters; and a unit that distributes the charge and discharge power decided by the charge and discharge power decision unit to the pairs of storage batteries and converters. The power distribution decision unit compares the charge and discharge total power with a limit output when conversion efficiency of the converters is equal to or greater than standard efficiency, and decides a running number by which an output of all the pairs of running storage batteries and converters is equal to or greater than the limit output when the charge and discharge total power is equal to or greater than the limit output.

14 Claims, 8 Drawing Sheets

(51) Int. Cl.
*H02J 3/32* (2006.01)
*H02J 7/02* (2016.01)
*H01M 10/42* (2006.01)
*H01M 10/48* (2006.01)

(52) U.S. Cl.
CPC .................. *H02J 3/32* (2013.01); *H02J 5/00* (2013.01); *H02J 7/0026* (2013.01); *H02J 7/02* (2013.01); *H02J 7/0013* (2013.01); *Y02T 10/7055* (2013.01)

(56) References Cited

FOREIGN PATENT DOCUMENTS

| JP | 2013-102572 A | 5/2013 |
| JP | 2013-172567 A | 9/2013 |

\* cited by examiner

[Fig. 1]
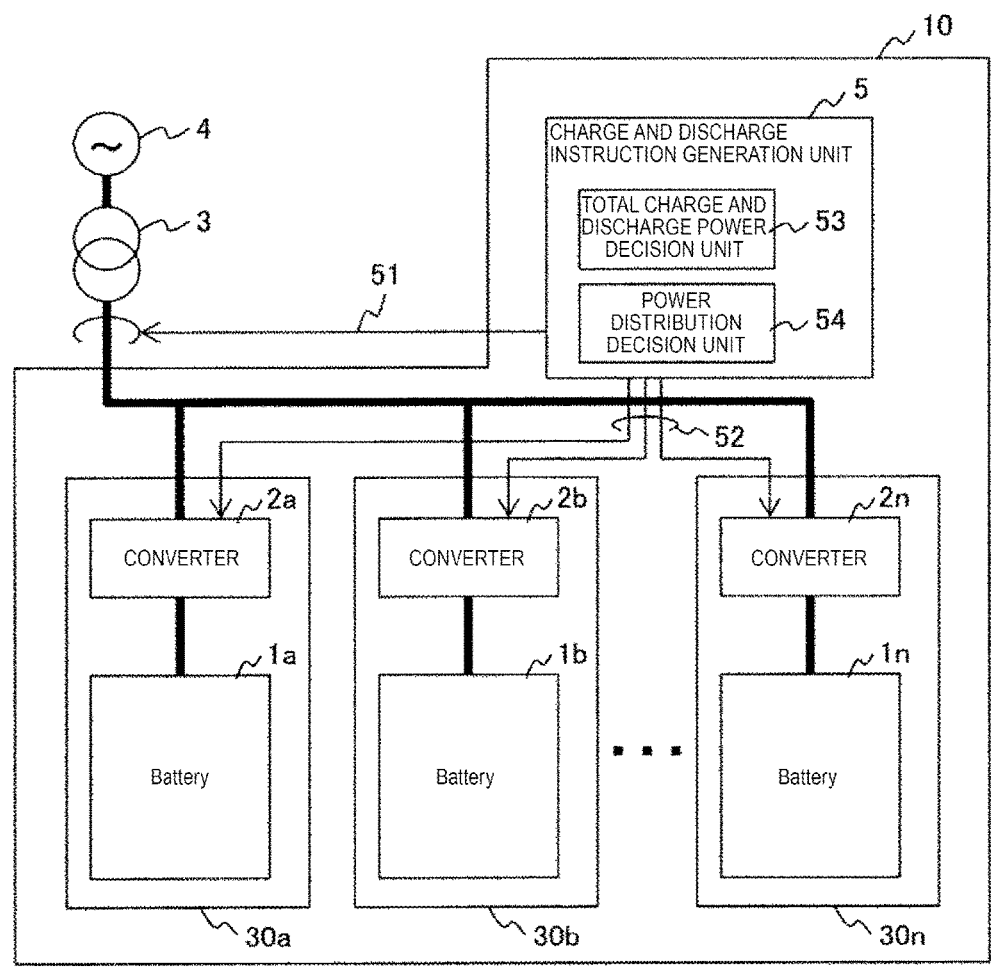

[Fig. 2]
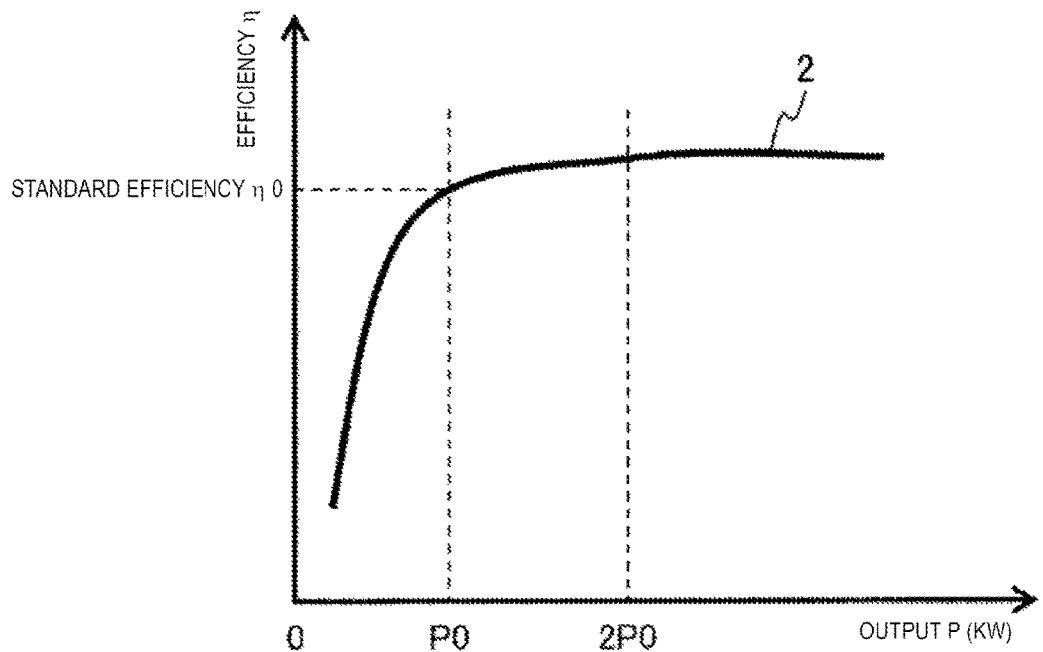

[Fig. 3]
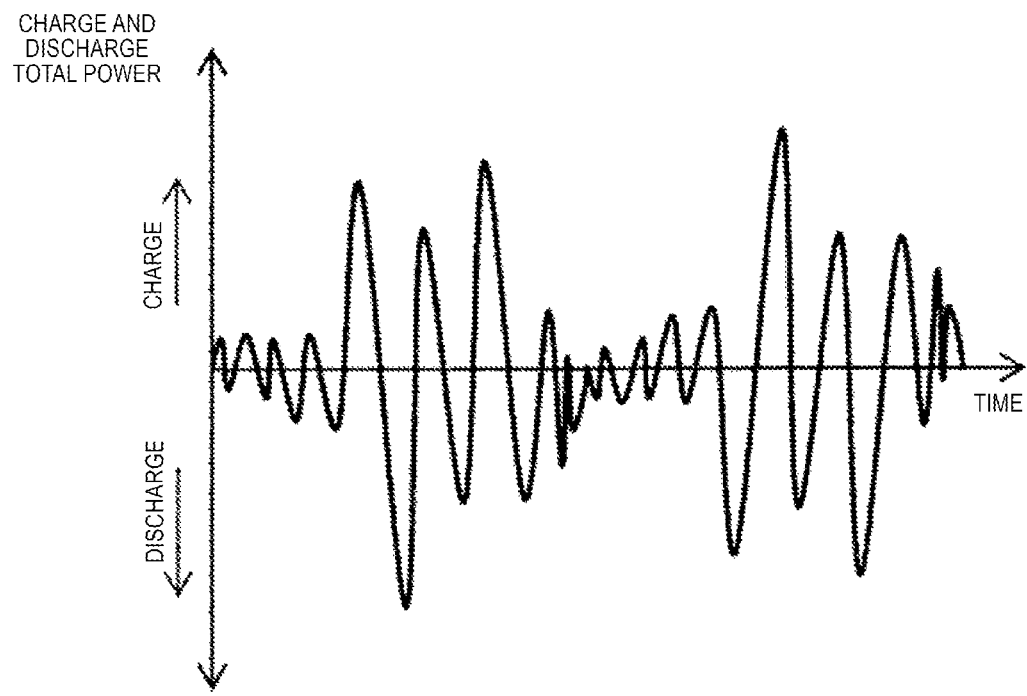

[Fig. 4]
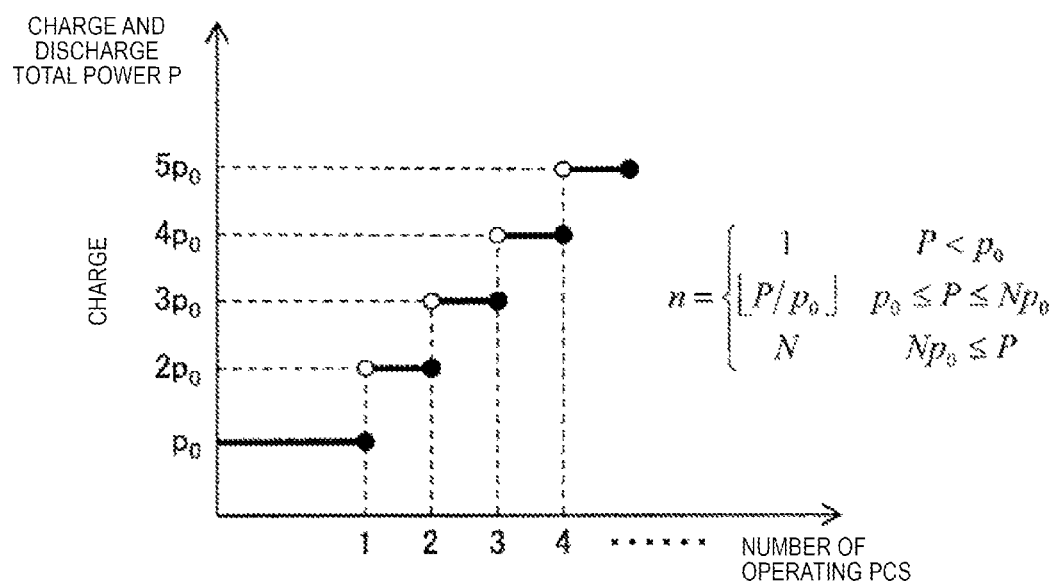

[Fig. 5]
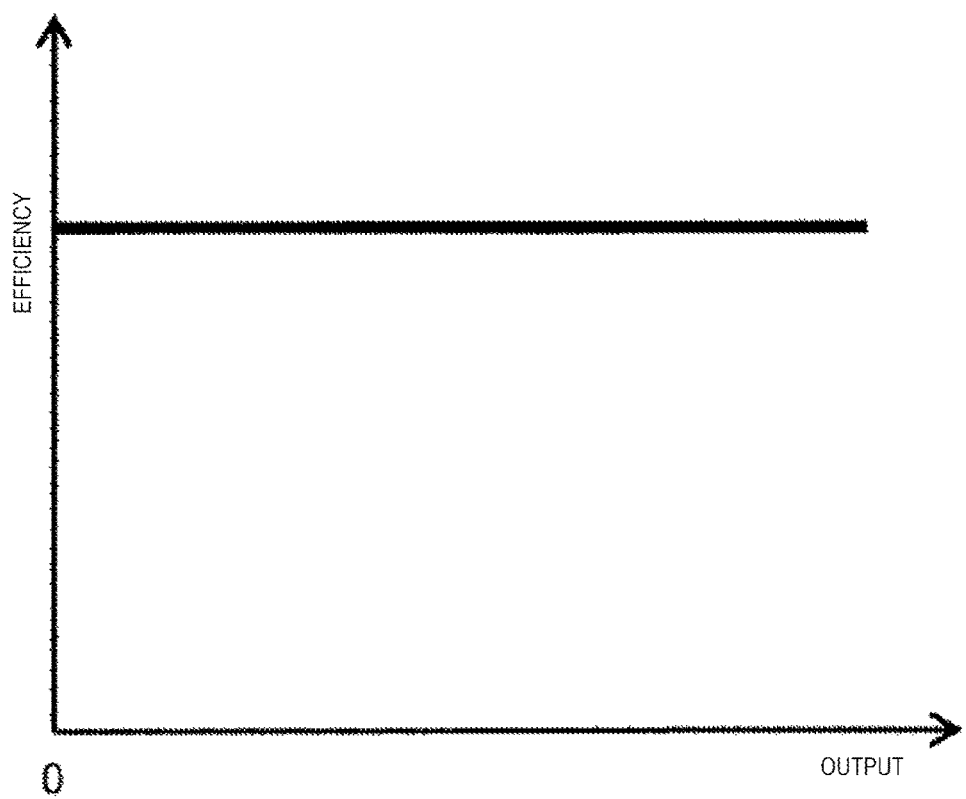

[Fig. 6]
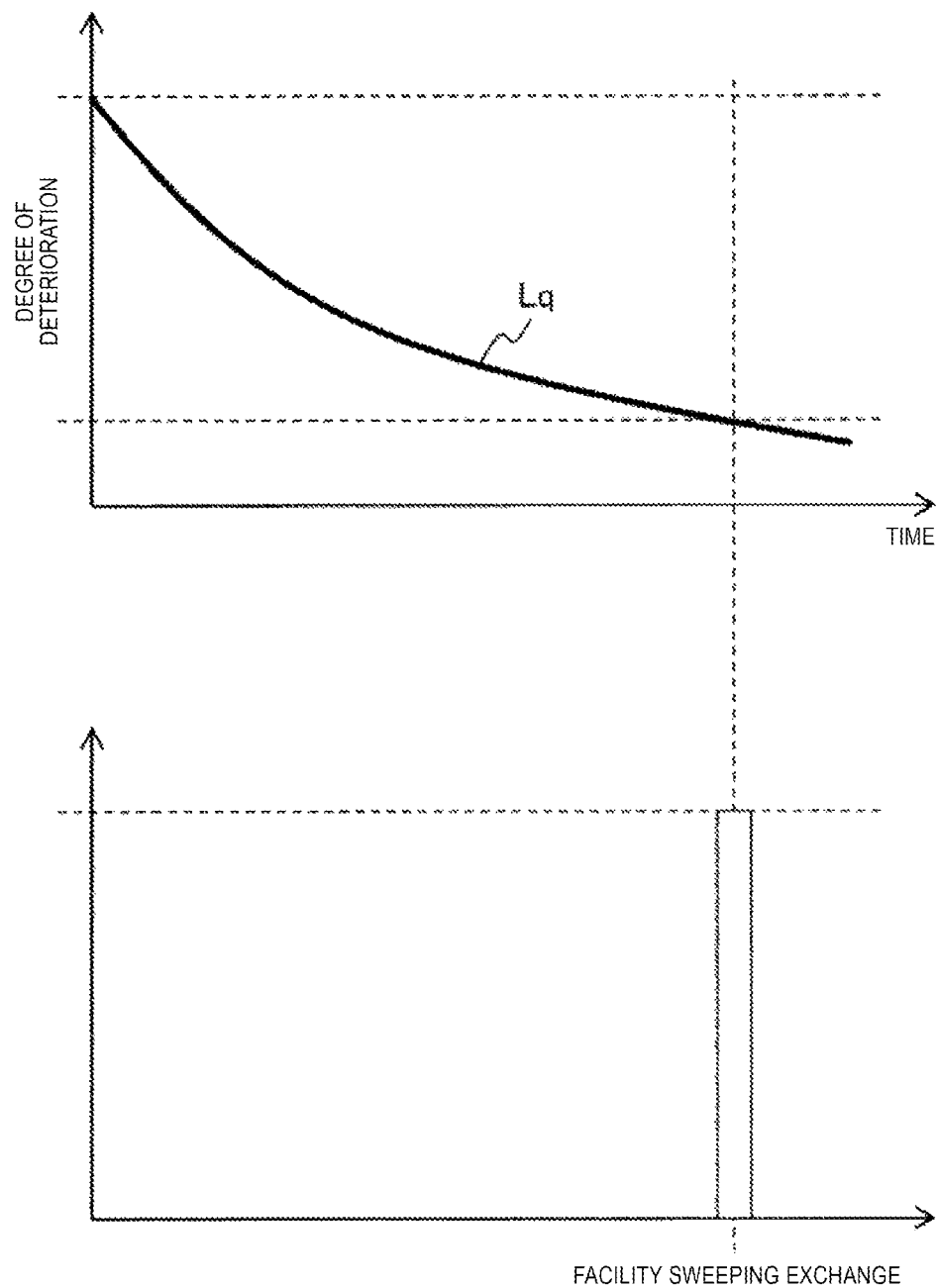

[Fig. 7]
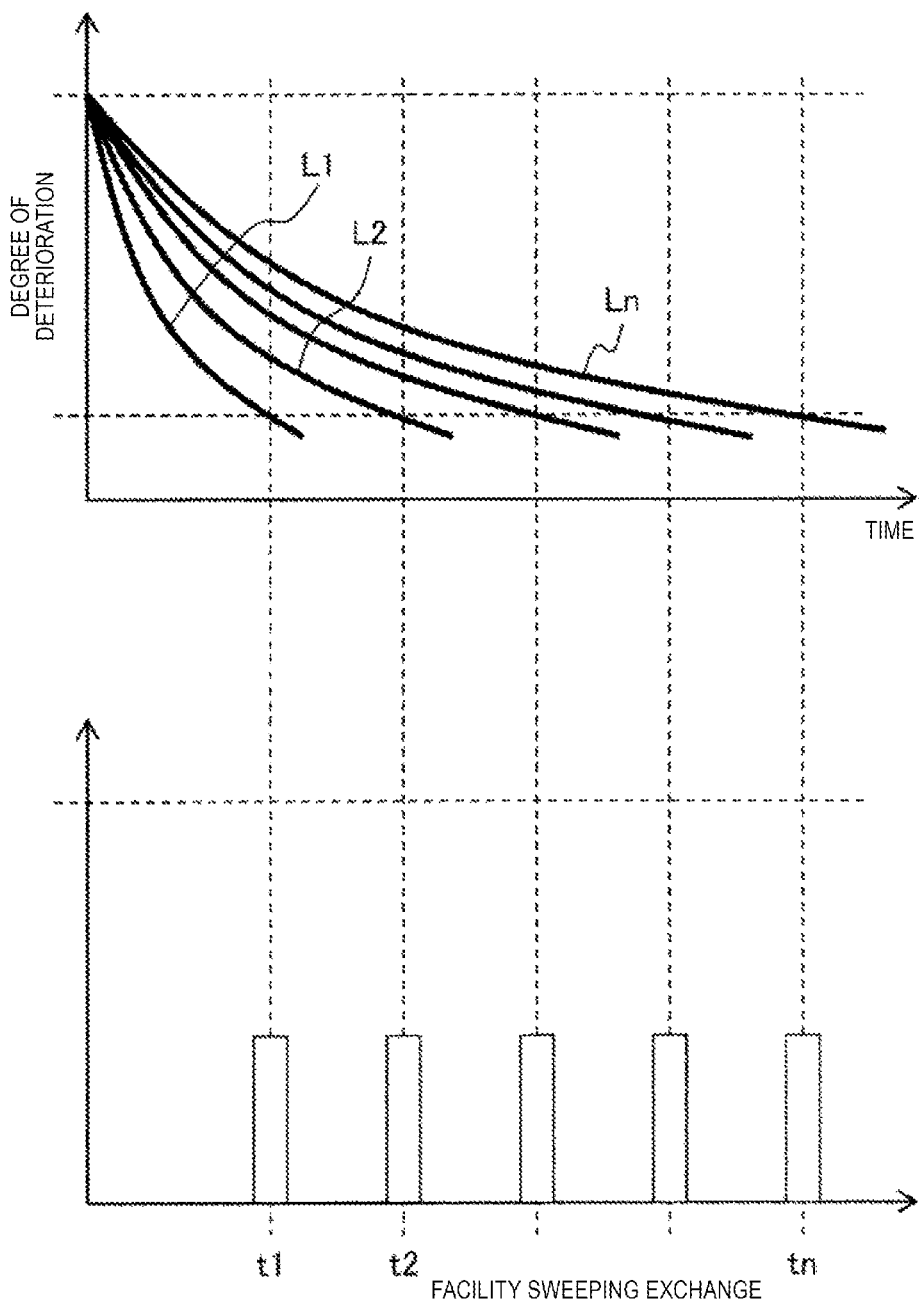

[Fig. 8]
| No. | STORAGE DEVICE 1 | ACCUMULATIVE CHARGE AND DISCHARGE POWER SPi | LIFE MAGNIFICATION yi |
|---|---|---|---|
| 1 | 1a | | |
| 2 | 1b | | |
| 3 | 1c | | |
[Fig. 9]
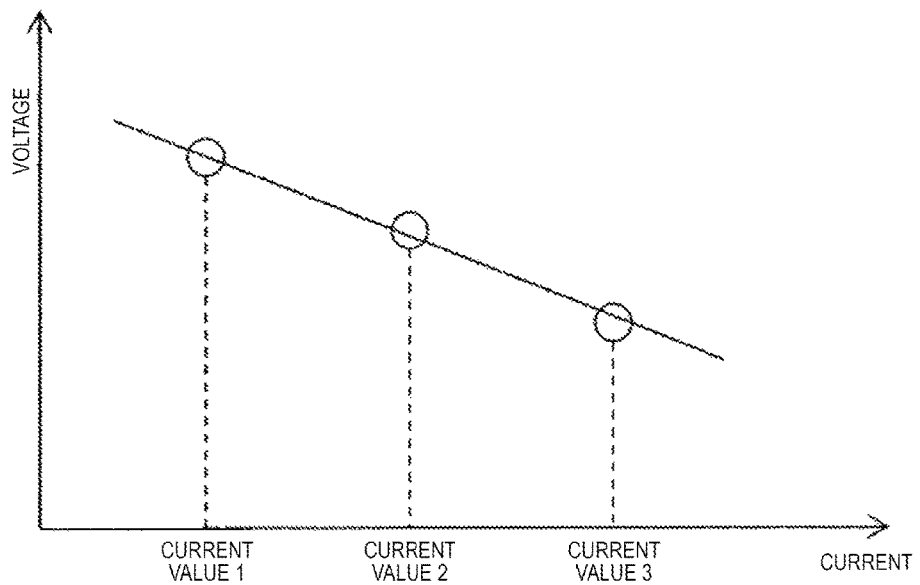

CONTROL SYSTEM FOR ELECTRIC STORAGE SYSTEM

TECHNICAL FIELD

The present invention relates to a control system for an electric storage system configured to include an electric storage device used to suppress a variation in a load of a power system and a power converter having an alternating-current and direct-current conversion function.

BACKGROUND ART

With an introduction of natural energy power generation devices using natural energies of wind power generation, solar power generation, and the like, to power systems there is a possibility of a variation in frequency, power, or the like occurring in power systems linked to power generation devices. As one of the countermeasures, a method of annexing an electric storage device to a natural energy power generation device and suppressing a variation in voltage of a power system has been proposed. A method of installing a storage battery to the side of a power system, detecting a variation in frequency and voltage of the system, and suppressing the variation has also been proposed.

Electric storage systems using related electric storage devices are different from electric storage systems mounted on moving objects such as hybrid automobiles or electric automobiles. In cases for power, while an increase in size and weight is allowed, capacity enlargement and high output are required to supplement power to power systems. Therefore, electric storage systems in which a plurality of electric storage units connecting power conversion devices to storage batteries are connected in parallel are necessary.

At this time, to configure electric storage systems in conformity to maximum outputs, it is necessary to control the number of electric storage units by changing the number of electric storage units performing charge and discharge according to loads. When the number of electric storage units is controlled, for example, PTL 1 discloses a method of evenly deteriorating storage batteries in electric storage units by evenly using electric storage units.

CITATION LIST

Patent Literature

PTL 1: JP-A-2013-102572

SUMMARY OF INVENTION

Technical Problem

However, since the device disclosed in PTL 1 decides the number of electric storage units according to the residual capacities of the storage batteries or use statuses, there is a problem that a viewpoint of conversion efficiency of a power conversion device is not considered and efficiency deterioration is not resolved in the entire electric storage system.

Only batteries are targets and efficiency is not improved in the entire system including a power converter. Regular operation is not regarded and separation is not considered.

The invention is devised in view of the above circumstances and an object of the invention is to provide a control system for an electric storage system capable of improving efficiency in the entire electric storage system.

Solution to Problem

In order to achieve the foregoing object, according to the invention, there is provided a control system for an electric storage system in which a plurality of pairs of storage batteries and converters are connected in parallel to a power system, and which includes a charge and discharge total power decision unit that decides charge and discharge total power by the plurality of pairs of storage batteries and converters, and a power distribution decision unit that distributes the charge and discharge total power decided by the charge and discharge total power decision unit to the plurality of pairs of storage batteries and converters. The control system for an electric storage system causes the power distribution decision unit to compare the charge and discharge total power with limit output when conversion efficiency of the converters is equal to or greater than standard efficiency, and to decide an operation number by which an output of all the pairs of operating storage batteries and converters is equal to or greater than the limit output when the charge and discharge total power is equal to or greater than the limit output.

Advantageous Effects of Invention

According to the invention, in order to reduce variations in voltage and frequency of the system, in the electric storage system in which the plurality of pairs of electric storage devices and converters are connected in parallel, it is possible to avoid using a low output region in which conversion efficiency of the converter is bad by limiting the number of electric storage devices performing charge and discharge and increasing an output per converter when a charge and discharge output to the system is a low output. Accordingly, it is possible to improve efficiency in the entire electric storage system. A maintenance process can be performed on the converter and the electric storage device stopped at the time of the low output, and thus it is not necessary to add an extra electric storage device for maintenance.

BRIEF DESCRIPTION OF DRAWINGS

FIG. 1 is a schematic diagram illustrating an electric storage system according to the invention.

FIG. 2 is a diagram illustrating a relation between an converter output and conversion efficiency T.

FIG. 3 is a diagram illustrating an example of charge and discharge total power given by a charge and discharge power decision unit.

FIG. 4 is a diagram illustrating ideas for deciding a number from the viewpoint of efficiency.

FIG. 5 is a diagram illustrating efficiency of the entire electric storage system by operation number control.

FIG. 6 is a diagram illustrating a deterioration curve L in a case in which a plurality of electric storage devices are evenly used for even deterioration.

FIG. 7 is a diagram illustrating individual deterioration curves L in a case in which a plurality of electric storage devices are unevenly used for deterioration.

FIG. 8 is a diagram illustrating a table used when individual deterioration control is performed.

FIG. 9 is a diagram illustrating a method of measuring internal resistance components of the electric storage device.

DESCRIPTION OF EMBODIMENTS

Hereinafter, embodiments of the invention will be described in detail with reference to the drawings.

EXAMPLE 1

FIG. 1 illustrates a schematic configuration of a storage battery system according to the invention.

A storage battery system 10 according to the invention is configured to include a plurality of electric storage devices 1 (1a to 1n) capable of performing charge and discharge, converters 2 (2a to 2n) installed in the electric storage devices 1, and a charge and discharge instruction generation unit 5 which is a control unit controlling the converters 2. In the storage battery system 10, the plurality of converters 2 converting input direct-current power into three-phase alternating current are connected in parallel to the electric storage devices 1 capable of performing charge and discharge and are connected to a power system 4 via a transformer 3 that performs isolation and voltage conversion.

For electric storage units 30 (30a to 30n) configured to include the electric storage devices 1 and the converters 2, the charge and discharge instruction generation unit 5 outputs a charge and discharge instruction 52 to each storage battery 1. The charge and discharge instruction generation unit 5 obtains voltage and current information of the side of the power system 4 from a sensor 51, decides total power (charge and discharge total power) for charge and discharge necessary to stabilize the voltage and current of the system from a change in the voltage and current information, and distributes the charge and discharge total power according to the states of the electric storage devices 1. At the time of the distribution, a running number, actually running serial numbers, and power burdened to the serial numbers are decided.

Hereinafter, an operation of the charge and discharge instruction generation unit 5 will be described in detail. The charge and discharge instruction generation unit 5 is configured to include a charge and discharge total power decision unit 53 and a power distribution decision unit 54. The charge and discharge total power decision unit 53 obtains voltage information of the system side from the sensor 51 and determines whether the voltage is within a regulated voltage range. In a case in which the voltage is within the regulated range, charge and discharge total power from the electric storage system 1 is 0 and power control using the electric storage units 30 configured to include the electric storage devices 1 and the converters 2 is not performed.

Conversely, in a case in which the voltage is not within the regulated range, the following is performed. First, in a case in which the voltage is low, supply power is insufficient. Therefore, power is output (discharged) from the storage batteries 1. Conversely, in a case in which the voltage is high, supply power is excessive. Therefore, power is charged to the storage batteries 1. Total power of charge and discharge is decided by multiplying a coefficient decided from the characteristics of the system and a deviation width from the regulated voltage range.

Based on the charge and discharge total power decided by the charge and discharge total power decision unit 53, the power distribution decision unit 54 decides an individual charge and discharge power to each electric storage device 1. The invention relates to a novel distribution system in the power distribution decision unit 54. Before the system of the invention is described, peripheral technologies and tasks will be clarified.

First, a simplest distribution method is a method of dividing charge and discharge total power P by the number n of electric storage devices 1 and outputting the resulting charge and discharge instruction P/n equally to the electric storage devices 1. The problems of this case are as follows.

Problem 1: FIG. 2 illustrates a relation between a converter output (a charge and discharge output kw of the storage battery) and conversion efficiency $\eta$ horizontally and vertically. As illustrated in FIG. 2, the converters 2 are different in the conversion efficiency $\eta$ of the charge and discharge output. In particular, in a case in which the charge and discharge output is low, the conversion efficiency is worsened. In the example of FIG. 2, when the charge and discharge output is equal to or less than a limit output P0 of efficiency, the efficiency starts deteriorating. Therefore, in a case in which the charge and discharge total power P output from the charge and discharge total power decision unit 53 is small, the charge and discharge power instruction value P/n to the electric storage devices 1 decreases when the charge and discharge total power P is evenly allocated to the number n of the electric storage devices 1. As a result, when P/n is less than the limit output P0 of efficiency, the efficiency of the entire electric storage system 1 may deteriorate.

Further, efficiency $\eta$ at the time of the limit output P0 of efficiency is assumed to be standard efficiency $\eta 0$. The standard efficiency $\eta 0$ may be appropriately set. For example, in a case in which running is expected in a region in which the conversion efficiency is equal to or greater than 90%, 90% is set as the standard efficiency $\eta 0$. An output (the limit output P0 of efficiency) at the time of the standard efficiency $\eta 0$ is located mainly within a range of about 30% to about 50% of the rated output in a case in which the standard efficiency $\eta 0$ is 90% depending on the converter.

Problem 2: There are an upper limit and a lower limit in a charge amount of the electric storage device 1. When the charge amount reaches the upper limit, further charge may not be performed. When the charge amount reaches the lower limit, further discharge may not be performed. For this reason, in a case in which the charge amounts of the storage batteries 1 are unbalanced, the electric storage system 1 may not be charged (discharged) furthermore when charging or discharging continues evenly for each storage battery 1 and the charge amount of one storage battery 1 reaches the upper limit (the lower limit).

Problem 3: For the electric storage system 1 for the system, an electric storage system with a large capacity of MW is required, and thus thousands to tens of thousands of electric batteries (cells) which are minimum units of batteries are necessary. The electric batteries gradually deteriorate by charging and discharging, and the charge and discharge performance (capacity or charge and discharge output) deteriorates. Therefore, when the charge and discharge performance is less than a required performance, it is necessary to exchange all of the electric batteries. However, as described above, in a case in which tens of thousands of electric batteries are exchanged at a time, a battery cost and the number of exchange processes are necessary, and thus it is not practical to exchange all of the electric batteries at a time in some cases.

The countermeasures against the above-assumed problems will be considered as follows in the invention. In the countermeasure herein, a case in which a charge and discharge total power illustrated in the example of FIG. 3 is output from the charge and discharge power decision unit 53 is assumed. The charge and discharge total power in FIG. 3 varies over time, and charging and discharging are repeated.

The magnitude of the charging and discharge is diverse. Solutions to the problems 1 to 3 are as follows under the assumption.

Solution to Problem 1: as illustrated in FIG. 4, the number of operating converters 20 (the number of electric storage units) is decided in the regard to charge and discharge total power P from the viewpoint of efficiency of the converters. Here, the vertical axis of FIG. 4 represents the charge and discharge total power P and means the limit output P0 of efficiency illustrated in FIG. 2 in this case. The horizontal axis of FIG. 4 represents the running number of operating electric storage units.

According to the ideas illustrated in FIG. 4, for example, when the charge and discharge total power P is within the range of P0, one unit with serial number 1 of the standard efficiency $\eta0$ is assumed to be running. As apparent compared to FIG. 2, the running is unavoidable in a state in which the conversion efficiency $\eta$ is low (efficiency equal to or less than the standard efficiency $\eta0=90\%$) in this state. In the invention, running of high efficiency (efficiency equal to or greater than the standard efficiency $\eta0=90\%$) is renounced during this period.

In contrast, in a region in which the charge and discharge total power P is equal to or greater than P0, running efficiency equal to or greater than the standard efficiency $\eta0=90\%$ is ensured normally in all of the electric storage units. For example, in a range in which the charge and discharge total power P is from P0 to 2P0, one unit with serial number 1 is continuously run. It is apparent from FIG. 2 that running efficiency $\eta$ equal to or greater than the standard efficiency $\eta0=90\%$ is ensured.

When the charge and discharge total power P reaches 2P0, a unit with serial number 2 is added, and thus the running number is increased to 2. Here, when the unit is added, the output of the unit with serial number 1 which has an output 2P0 is dropped to P0 and the output of the added unit with serial number 2 is instantaneously increased to P0. Accordingly, identical-output parallel running is performed in two units. The identical-output parallel running of the two units with serial numbers 1 and 2 continues until the charge and discharge total power P reaches, for example, 3P0. Since the output of the added unit with serial number 2 is instantaneously increased to P0, a conversion efficiency deterioration period in the meantime is considerably small, and thus rarely has an influence on the final overall efficiency of the electric storage units. Even at this time, it is apparent from FIG. 2 that the running efficiency $\eta$ equal to or greater than the standard efficiency $\eta0=90\%$ is ensured.

As the ideas of the control of the running number with a subsequent increase in the charge and discharge total power P is apparent from the above description, the ideas when the charge and discharge total power P reaches 3P0 will be described just in case.

When the charge and discharge total power P reaches 3P0, a unit with serial number 3 is added, and thus the running number is increased to 3. The outputs of the units with the initial serial number and serial number 2 which have an output 1.5P0 are dropped to P0 and the output of the added unit with serial number 3 is instantaneously increased to P0. Accordingly, identical-output parallel running is performed in three units. The identical-output parallel running of the three units with serial numbers 1, 2, and 3 continues until the charge and discharge total power P reaches 4P0. Since the output of the added unit with serial number 3 is instantaneously increased to P0, a conversion efficiency deterioration period in the meantime is considerably small, and thus rarely has an influence on the final overall efficiency. Even at this time, it is apparent from FIG. 2 that the running efficiency $\eta$ equal to or greater than the standard efficiency $\eta0=90\%$ is ensured.

In a word, as described above, the efficiency deterioration is overlooked in the state of the charge and discharge total power P equal to or less than the limit output P0 of efficiency. However, in the state of the charge and discharge total power P equal to or greater than the limit output P0 of efficiency, all of the units are run in a high efficiency region equal to or greater than the standard efficiency $\eta0=90\%$.

The number decision illustrated in FIG. 4 is not limited to the illustrated method. For example, the identical-output parallel running of two units may continue until 4P0 (2P0 in each unit) and addition of the third unit may start from 4P0/3 of the units. In a word, the first burden of an added unit equal to or greater than the limit output P0 of efficiency may be ensured.

Accordingly, when the value of the charge and discharge total power is a low output, the number of operating converters 2 is decreased. As a result, the output of each of the converters 2 can be considerably increased. Therefore, as illustrated in FIG. 5, in all of the regions of the charge and discharge total power, it is possible to maintain a state in which the conversion efficiency is high in the operating converters 2. Thus, it is possible to reduce a loss in the converters 2 and improve the overall efficiency in the entire storage battery system 10.

When the output control method in the foregoing ideas for deciding the number is summarized, one unit is run at the time of the charge and discharge total power P equal to or less than the limit output P0 of efficiency. The plural-number parallel running is performed at the time of the charge and discharge total power P equal to or less than the limit output P0 of efficiency. One of the ideas for the output distribution at this time is separate running and another idea is plural-number identical-output parallel running.

The plural-number identical-output parallel running has been mainly described above. The disadvantage of this case is that the output may be disturbed in a case in which an output change timing of each conversion device is deviated at the time of an abrupt output change.

As s method of the separate running, it is considered that one specific unit performs variable output running and the outputs of the other units are fixed. In the case of this method, there is the advantage that control at the time of an abrupt output is easy. For example, in the case of an abrupt output increase, non-operated units are launched. In the case of an abrupt output decrease, the operating units of the fixed output are stopped. Fine adjustment can be handled by variable output running of one specific unit. In a case in which the output is constant for a given time, it is possible to control deterioration in the batteries by even charging and discharging of the batteries by appropriately converting and using the units of the variable output running.

Solution to Problem 2: In the invention, the foregoing running (the number decision from the viewpoint of efficiency and ensuring of the high efficient running of the electric storage units by the plural-number identical output parallel running) is performed basically. The countermeasure against the problem 2 is performed as follows. In this case, different-output parallel running is performed as follows in a region in which high efficiency can be ensured without performing the plural-number identical output parallel running.

That is, in a case in which a charge amount is different between a plurality of certain electric storage devices 1, the charge and discharge total power is allocated according to the charge amount of each electric storage device 1. That is, when P is assumed to be the charge and discharge total power and SOCi is assumed to be the charge amount of each electric storage device 1, charge and discharge power Pi of each electric storage device 1 can be obtained from formulae (1) to (4) below. In the formulae, αi is a coefficient of each electric storage device 1 and SOCmax and SOCmin are upper limit and lower limit values of a charge amount SOC.

[Math. 1]

$$Pi = \alpha i \times P \quad (1)$$

[Math. 2]

$$\text{SUM}(\alpha i) = 1 \quad (2)$$

[Math. 3]

$$\text{Discharge time: } \alpha i = (SOCi - SOC\text{min})/\text{SUM}(SOCi - SOC\text{min}) \quad (3)$$

[Math. 4]

$$\text{Charge time: } \alpha i = (SOC\text{max} - SOCi)/\text{SUM}(SOC\text{max} - SOCi) \quad (4)$$

According to formula (1), the charge and discharge power Pi of each electric storage device 1 is obtained by multiplying the charge and discharge total power P by the coefficient αi of each electric storage device 1. According to formula (2), a sum of the coefficients αi of the electric storage device 1 is 1. Therefore, a sum of the charge and discharge power Pi of the running electric storage devices 1 is distributed to match the charge and discharge total power P.

The coefficient αi is obtained for each electric storage device 1 by different formulae between charge and discharge times. The calculation formula at the charge time is described as formula (3) and the calculation formula at the discharge time is described as formula (4). According to the formulae, the coefficient αi is decided as a ratio of an allowable charge amount of the individual electric storage device to an allowable charge amount of all the electric storage devices. The allowable charge amount is defined as a difference between the upper limit and lower limit values (SOCmax and SOCmin) of the charge amount SOC and the charge amount SOC of the electric storage device.

Accordingly, the obtained charge and discharge total power P is achieved in all of the electric storage devices. The individual electric storage device is controlled according to an allowable degree for the upper limit and lower limit values (SOCmax and SOCmin). That is, from the viewpoint of the individual electric storage device, charge and discharge power to the electric storage device 1 close to the upper limit (SOCmax) of the charge amount at the charge time and the lower limit (SOCmin) of the charge amount at the discharge time decreases. Conversely, the charge and discharge power to the electric storage device 1 of the high allowable degree distant from the upper limit (SOCmax) of the charge amount at the charge time and the lower limit (SOCmin) of the charge amount at the discharge time increases. In the invention, the charge and discharge power can be distributed according to the charge amount in this way. Further, αi can also be obtained as a function according to the characteristics of the batteries.

The foregoing unbalanced running is performed in a high efficiency region as much as possible. The running is performed in the high efficiency region, excluding a running range equal to or less than the output P0 in the running of one unit.

Solution to Problem 3: FIG. 6 illustrates a deterioration curve L in a case in which the plurality of electric storage devices are evenly used and equally deteriorate on coordinates of which the vertical axis represents the degree of deterioration and the horizontal axis represents a time. In an instance of a related even operation, the electric batteries of the electric storage devices 1 evenly deteriorate. Therefore, since all of the electric batteries are simultaneously exchanged, cost of exchange expense is born at a time.

Accordingly, as illustrated in FIG. 7, by manipulating a deterioration speed in units of electric storage devices 1 to delay exchange times and exchanging the batteries regularly, it is possible to suppress the exchange expense at each time and to suppress maintenance expense of a user. Several methods of implementing the suppression are assumed. The vertical and horizontal axes of FIG. 7 are the same as those of FIG. 6. Here, L1 indicates a deterioration curve of the unit with serial number 1, L2 indicates a deterioration curve of the unit with serial number 2, and Ln indicates a deterioration curve of a unit with serial number n. By setting running results such that the deterioration curves of the respective units to become those illustrated in FIG. 7, it is possible to perform control such that equipment exchange times of the units come in sequence. In the illustrated case, an exchange time of the most severely run unit with serial number 1 is a time t1, an exchange time of the secondly severely run unit with serial number 2 is a time t2 after the time t1, and an exchange time of the least severely run unit with serial number n is a time tn.

A first method of realizing the individual deterioration in FIG. 7 will be described. This method is realized as follows. First, deterioration of a battery is known to be proportional to accumulation of charge and discharge power. Accordingly, in a case in which the charge and discharge power Pi to each electric storage device 1 is doubled for the electric storage device 1a than for the other electric storage device 1b and the like, charge and discharge power P1 for the electric storage device 1a may be set to be twice than charge and discharge power P2 of the electric storage device 1b. P1=2×P2 may be satisfied.

That is, when yi is assumed to be a life magnification of each electric storage device 1 (in the foregoing example, y1=2 and y2=. . . =yn=1), the charge and discharge power Pi to each electric storage device 1 is set as in formulae (5) to (7) below.

[Math. 5]

$$Pi = \beta i \times P \quad (5)$$

[Math. 6]

$$\text{SUM}(\beta i) = 1 \quad (6)$$

[Math. 7]

$$\beta i = (yi \ast \text{SUM}(1/yi))^{-1} \quad (7)$$

According to formula (5), the charge and discharge power Pi of each electric storage device 1 is obtained by multiplying the charge and discharge total power P by a coefficient βi of each electric storage device 1. According to formula (6), a sum of the coefficients βi of the electric storage devices 1 is 1. Therefore, a sum of the charge and discharge power Pi of the running electric storage devices 1 is distributed to match the charge and discharge total power P. According to formula (7), the coefficient βi of each electric storage device 1 is obtained from a life magnification y of each electric storage device 1.

The deterioration of the battery is proportional to the accumulation of the charge and discharge power and is also proportional to a root rule (square root) in some cases. Additionally, the deterioration is regulated by a maximum current, a use charge amount range, or the like in some cases.

For example, in a case in which the deterioration conforms to the root rule of the accumulation of the charge and discharge power, the coefficient βi of each electric storage device 1 may be obtained from the life magnification y of each electric storage device 1 by formula (8).

[Math. 8]

$$\beta i = (yi^2 * \text{SUM}(1/yi^2))^{-1} \quad (8)$$

The output to the electric storage devices is distributed in this way. Then, for example, in a case in which the deterioration of the battery is proportional to the accumulation of the charge and discharge power, the life of the electric storage device 1-k (where 2≤k≤n) can be controlled to become a life after k years, when yi=i, in a case in which the life of the electric storage device 1a is 1 year. As described above, by combining the solutions 1 to 3, it is possible to distribute the charge and discharge total power P according to the states (the charge amounts or deterioration) of the electric storage devices 1.

Incidentally, when the residual life is controlled as in FIG. 7, which converters 2 are operated is a task. The decision is performed using a table illustrated in FIG. 8. The table of FIG. 8 describes an accumulative charge and discharge power Spi of the electric storage devices 1 and the life magnification yi of the solution 3. The solution 3 will be described below using formula (2).

First, the operation number of converters 2 is decided from the viewpoint of efficiency described in the solution 1. This process has been described above, and thus the description thereof will be omitted.

Next, the operation number of actually operating converters 2 among the plurality of converters is decided. Here, for each converter 2, the accumulative charge and discharge power Spi/the life magnification yi is calculated with reference to the table of FIG. 8. According to the calculation result, the operation number of converters is decided in order from the smaller calculated values. In the following description, the number of operating converters 2 is assumed to be k. For simplicity, 2k converters from the converter 2a are assumed to operate.

For the electric storage devices 1 (1a to 1k) connected to k operating converters (2a to 2k), information regarding the charge amount: SOCi, the coefficient αi, the life magnification yi, and the coefficient βi are obtained. The information regarding the charge amount: SOCi, the coefficient αi, the life magnification yi, and the coefficient βi can be obtained with reference to the table of FIG. 8 or by performing the foregoing formulae.

Next, a distribution coefficient is decided. Here, smaller coefficients between the coefficients αi and βi for the k operating electric storage devices 1 (1a to 1k) are extracted as coefficients γi. Further, the extracted coefficients γi are arranged in the ascending order, the smallest coefficient γi is first decided as γ1, and then α1=β1=γ1 is substituted to the formula (1) or (5) and the charge and discharge power P1 of the first electric storage device 1 is decided. Similarly, the smallest γi among the remaining coefficients α2 to αk and βP2 to βk is decided as γ2 and γk is finally decided. Similarly, the sequentially decided coefficients are substituted to the formula (1) or (5) and the charge and discharge powers P2 and Pk of the subsequent electric storage devices 1 are decided.

When yi=1 (even deterioration) is set, γi=αi is obtained. Therefore, the calculation in formula (8) is not necessary.

By adopting the foregoing running system, the electric storage units can be handled as follows. First, since no current flows in the converters 2 and the electric storage devices 1 in which charge and discharge are stopped at the time of low output, calibration of a current sensor in this state, that is, offset adjustment, can be performed.

Since the stopping electric storage units do not perform charge and discharge with the system 4, internal resistance components of the electric storage devices 1 can be measured by switching the operations of the converters 2 to a trial mode, flowing a pulse current, and measuring variations in voltages of the electric storage devices 1 at that time. FIG. 9 illustrates internal resistance characteristics of the storage battery when the horizontal axis represents a current and the vertical axis represents a voltage. Here, by flowing three current values (for example, 1 A, 30 A, and 90 A) to the electric storage devices 1 and plotting the voltages at that time, inclinations are obtained as resistance components.

By changing the voltage at the time of flowing constant current, it is possible to measure the capacity of the electric storage device 1. When a charge amount (SOC0) before flow of a current and a charge amount (SOC1) after flow of the current are taken and q (a positive value is charge) is assumed to be a current integrated value in the meantime, the capacity can be obtained as a capacity Q=q/(SOC1−SOC0) of the electric storage device 1. Thus, this measurement system is widely known.

To ensure a time necessary for maintenance, the stopped converters 1 may not operate again for a given time.

REFERENCE SIGNS LIST 1 electric storage device
2 converter
3 transformer
4 system
5 charge and discharge instruction generation unit
10 storage battery system
53 charge and discharge total power decision unit
54 power distribution decision unit

The invention claimed is:

1. A control system to control an electric storage system in which a plurality of pairs of storage batteries and converters are connected in parallel to a power system, comprising:
a controller configured to control a charge total power received by the plurality of pairs of storage batteries and converters,
wherein a total number of the plurality of pairs of storage batteries and converters is N, and N is ≥2,
wherein the controller is configured to:
compare the charge total power (P) to be received by the plurality of pairs of storage batteries and converters with a limit output ($p_0$) corresponding to a predetermined conversion efficiency of a first pair of the storage batteries and converters
when $p_0 \leq P \leq N \times p_0$, determine an operation number (n) of the pairs of storage batteries and converters which are to operate to receive the P in parallel, where n is equal to an integer quotient of $P/p_0$, and
wherein the controller is further configured to:
determine respective charge powers ($P_i$) of each of the n pairs of storage batteries and converters for a charge operation based on respective states of charge ($SOC_i$) of each of the n pairs of storage batteries and converters and a predetermined upper limit charge amount ($SOC_{max}$).

2. The control system to control the electric storage system according to claim 1,
wherein the controller is further configured to:
determine a plurality of first coefficients $\alpha_i$ such that $\alpha_i = (SOC_{max} - SOC_i)/sum(SOC_{max} - SOC_i)$ where $P_i = \alpha_i \times P$ and $sum(\alpha_i) = 1$.

3. The control system to control the electric storage system according to claim 2,
wherein the $\alpha_i$ are different for the n pairs of storage batteries and converters.

4. The control system to control the electric storage system according to claim 2,
wherein respective predetermined life magnification values ($y_i$) are set for each of the N pairs of storage batteries and converters, and
wherein the controller is further configured to:
determine a plurality of second coefficients $\beta_i$ such that $\beta_i = (y_i \times sum(1/y_i))^{-1}$ where $P_i = \beta_i \times P$ and $sum(\beta_i) = 1$.

5. The control system to control the electric storage system according to claim 2,
wherein respective predetermined life magnification values ($y_i$) are set for each of the N pairs of storage batteries and converters, and
wherein the controller is further configured to:
determine a plurality of second coefficients $\beta_i$ such that $\beta_i = (y_i^2 \times sum(1/y_i^2))^{-1}$ where $P_i = \beta_i \times P$ and $sum(\beta_i) = 1$.

6. The control system to control the electric storage system according to claim 4,
wherein the controller is further configured to:
select the smaller of the first and second coefficients $\alpha_i$ and $\beta_i$ to determine the respective $P_i$ of each of the n pairs of storage batteries and converters for the charge operation, and
control the n pairs of storage batteries and converters to receive the charge powers $P_i$ in parallel so that the charge total power P is received by the n pairs of storage batteries and converters.

7. The control system to control the electric storage system according to claim 5,
wherein the controller is further configured to:
select the smaller of the first and second coefficients $\alpha_i$ and $\beta_i$ to determine the respective $P_i$ of each of the n pairs of storage batteries and converters for the charge operation, and
control the n pairs of storage batteries and converters to receive the charge powers $P_i$ in parallel so that the charge total power P is received by the n pairs of storage batteries and converters.

8. A control system to control an electric storage system in which a plurality of pairs of storage batteries and converters are connected in parallel to a power system, comprising:
a controller configured to control a discharge total power output by the plurality of pairs of storage batteries and converters,
wherein a total number of the plurality of pairs of storage batteries and converters is N, and N is $\geq 2$,
wherein the controller is configured to:
compare the discharge total power (P) to be output by the plurality of pairs of storage batteries and converters with a limit output ($P_0$) corresponding to a predetermined conversion efficiency of a first pair of the storage batteries and converters,
when $p_0 \leq P \leq N \times p_0$, determine an operation number (n) of the pairs of storage batteries and converters which are to operate to output the P in parallel, where n is equal to an integer quotient of $P/p_0$, and
wherein the controller is further configured to:
determine respective discharge powers ($P_i$) of each of the n pairs of storage batteries and converters for a discharge operation based on respective states of charge ($SOC_i$) of each of the n pairs of storage batteries and converters and a predetermined lower limit charge amount ($SOC_{min}$).

9. The control system to control the electric storage system according to claim 8,
wherein the controller is further configured to:
determine a plurality of first coefficients $\alpha_i$ such that $\alpha_i = (SOC_i - SOC_{min})/sum(SOC_i - SOC_{min})$.

10. The control system to control the electric storage system according to claim 9,
wherein the $\alpha_i$ are different for the n pairs of storage batteries and converters.

11. The control system to control the electric storage system according to claim 9,
wherein respective predetermined life magnification values ($y_i$) are set for each of the N pairs of storage batteries and converters, and
wherein the controller is further configured to:
determine a plurality of second coefficients $\beta_i$ such that $\beta_i = (y_i \times sum(1/y_i))^{-1}$ where $P_i = \beta_i \times P$ and $sum(\beta_i) = 1$.

12. The control system to control the electric storage system according to claim 9,
wherein respective predetermined life magnification values ($y_i$) are set for each of the N pairs of storage batteries and converters, and
wherein the controller is further configured to:
determine a plurality of second coefficients $\beta_i$ such that $\beta_i = (y_i^2 \times sum(1/y_i^2))^{-1}$ where $P_i = \beta_i \times P$ and $sum(\beta_i) = 1$.

13. The control system to control the electric storage system according to claim 11,
wherein the controller is further configured to:
select the smaller of the first and second coefficients $\alpha_i$ and $\beta_i$ to determine the respective $P_i$ of each of the n pairs of storage batteries and converters for the charge operation, and
control the n pairs of storage batteries and converters to output the discharge powers $P_i$ in parallel so that the discharge total power P is output by the n pairs of storage batteries and converters.

14. The control system to control the electric storage system according to claim 12,
wherein the controller is further configured to:
select the smaller of the first and second coefficients $\alpha_i$ and $\beta_i$ to determine the respective $P_i$ of each of the n pairs of storage batteries and converters for the charge operation, and
control the n pairs of storage batteries and converters to output the discharge powers $P_i$ in parallel so that the discharge total power P is output by the n pairs of storage batteries and converters.

* * * * *